INVENTORS
C. WALTON MUSSER
MAURICE R. RANSOM
BY
AGENT

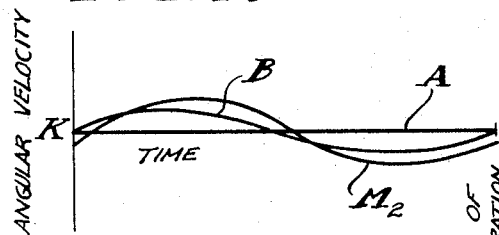
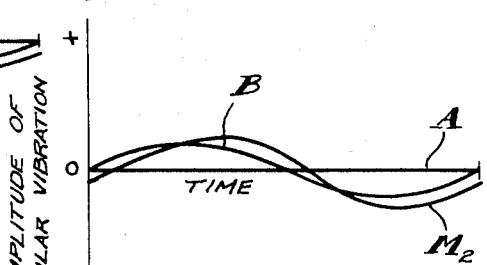
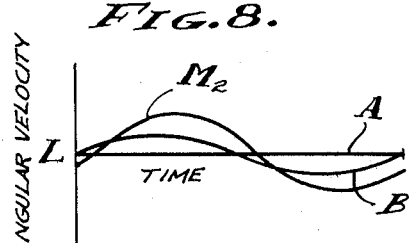
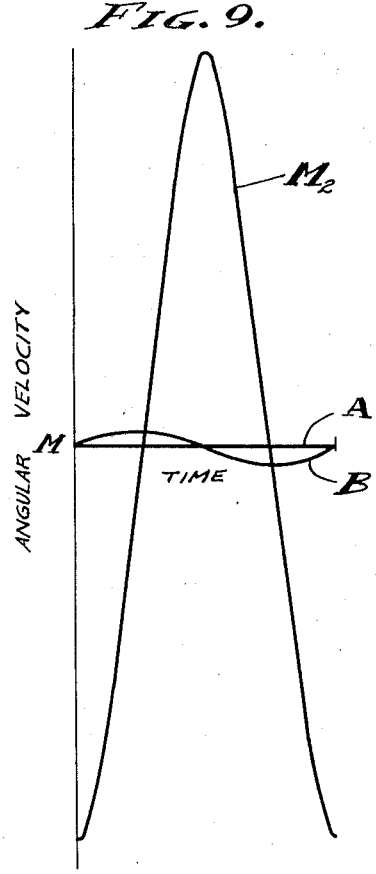
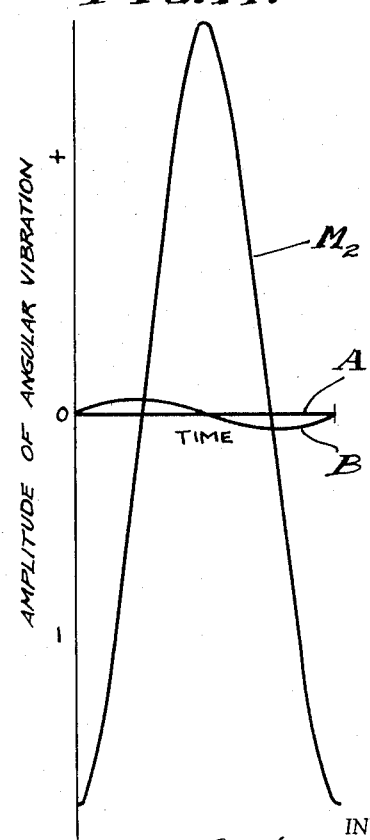

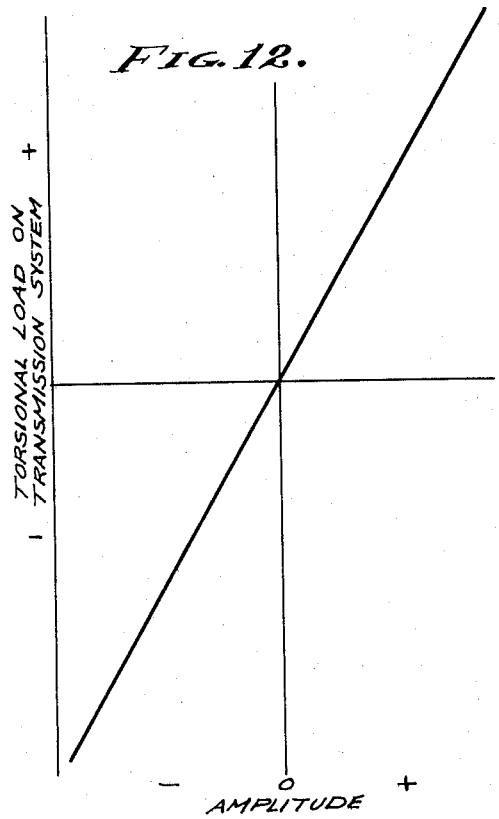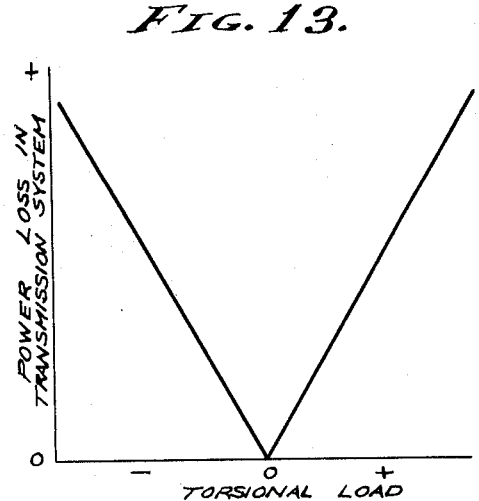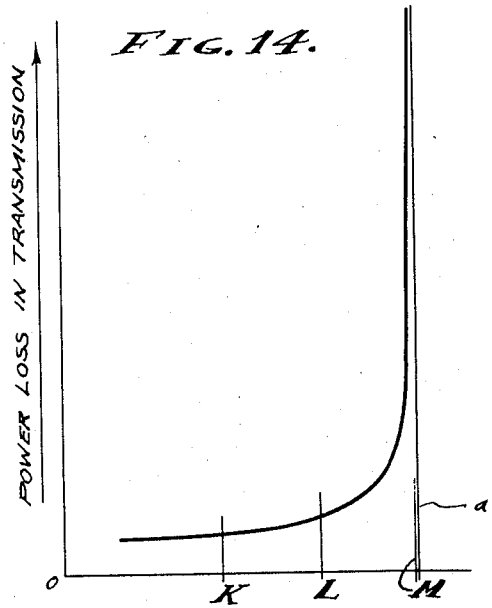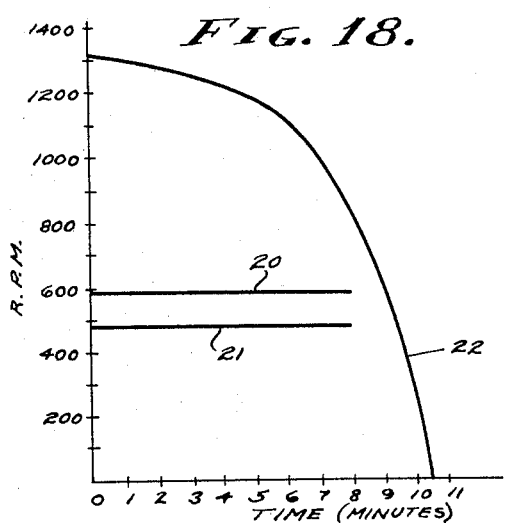

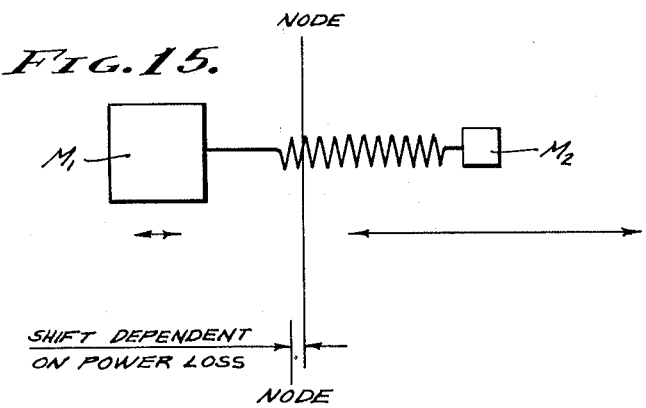
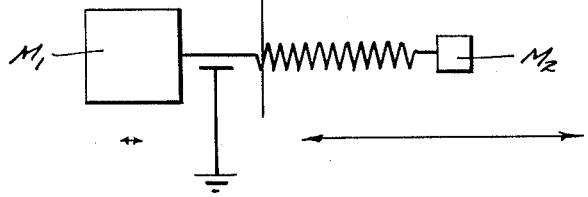
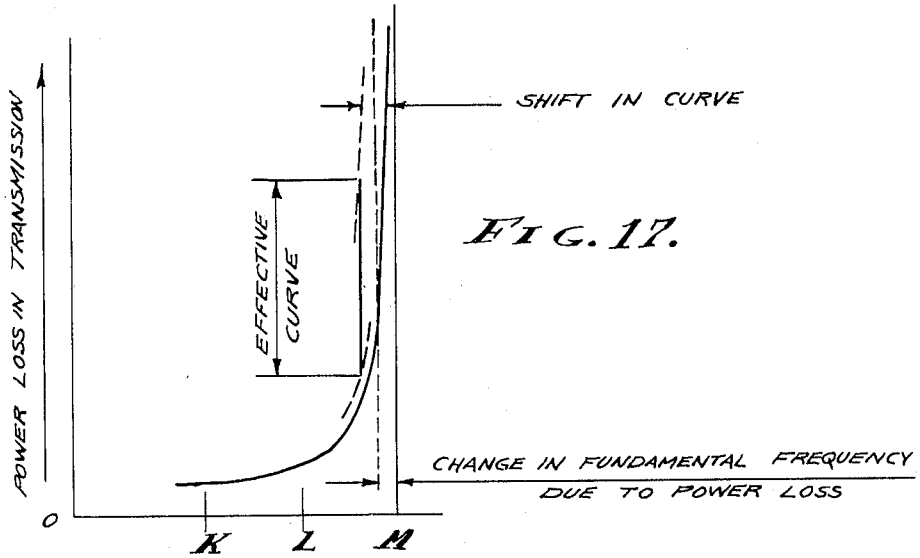

United States Patent Office

3,217,485
Patented Nov. 16, 1965

3,217,485
WAVE ENERGY METHOD AND VELOCITY REGULATION DEVICE
C Walton Musser, Palos Verdes, and Maurice R. Ransom, Torrance, Calif., assignors to Harvey Aluminum (Incorporated), Torrance, Calif., a corporation of California
Filed Mar. 30, 1964, Ser. No. 355,788
12 Claims. (Cl. 58—2)

This invention relates to a method of timing and to the regulation of velocity in a rotating shaft or the like and employs wave energy associated with torsional vibration as the controlling media to gain this end.

This invention is similar in some respects to the invention entitled Wave Energy Method and Apparatus for Time Determination, issued to C Walton Musser as United States Patent No. 3,113,415, on December 10, 1963. However, said previous invention is limited to the treatment of a radially moving elastically constrained mass, whereas the present invention is concerned with a further improvement which advantageously employs a rotatably moving elastically constrained mass. That is, in the first instance a revoluble radially vibratory mass is involved, whereas in the second and present instance a revoluble torsional vibrating mass is involved. The regulatory effect of a pendulum was later added, and a hairspring was added to the balance wheel. The interaction between a properly designed spring and the inertia of a rotating body produces a simple harmonic motion of a constant time period. Thus, ordinary timepieces need act only on the oscillatory time measuring system during a brief part of the time cycle, and this is at that portion of the time cycle where one tooth escapes or is dropped and the next tooth is placed in position for the succeeding cycle.

With the prior art timepieces, as referred to in general above, the gear train must accelerate to the velocity occasioned by the balance wheel, impart a small impulse, and then decelerate to a full stop, and within a small portion of each "tick" or time increment the entire gear train must be accelerated to its full maximum velocity and then positively brought to rest. This acceleration and deceleration must be accomplished in an exceedingly short time and the acceleration rates must be relatively high. For ordinary timepieces with a time interval of one-fifth of a second, for example, the escapement is sufficiently sturdy without requiring an excessive mainspring, or power supply. Again, however, through a rotating elastically constrained mass, an isochronal variation in rotational velocity synchronizes and interlocks with a non-linear motion to produce an accurately controlled constant angular velocity. One of the most basic and accurate time constants known to man is the reciprocal conversion of kinetic and potential energy within an elastic medium, and this time constant is applied to the mechanical timing device herein disclosed.

Mechanical timepieces are ordinarily composed of three basic interrelated mechanisms. The first of these provides the repeated cycle of precise time intervals, the second mechanically counts or adds these intervals, and, the third is the energy source providing the driving power. In most timepieces the second and third functions utilize gear trains of some type, and these trains are usually combined and used for both functions. The regulatory or time measuring function of timepieces is known generally as an escapement since it allows a captured tooth of the gear train to escape. The energy delivered by the power source to the final wheel of the train was historically used to oscillate a balance wheel, and since the period of oscillation was dependent upon the inertia of the balance wheel and the force acting against it a tremendous amount of effort was expended by horologists to provide a sufficiently uniform force output. However, the length of time of one time interval (one-fifth of a second) limits the accuracy to which time can be measured. Hence, when it becomes necessary to measure finer increments of time, it becomes necessary to decrease the time interval, or increase the number of "ticks" per second, and this imposes serious problems due to the inertia involved. Therefore, it becomes necessary to use stiffer springs and lighter masses in the balance wheel, resulting in a considerably smaller magnitude of oscillation and with a relatively smaller factor of safety. It can be concluded, therefore, that ordinary mechanical timepieces of the conventional design referred to are limited by the inertia of their systems.

To summarize the deficiencies of the prior art timepieces it can be said that very small increments of time cannot be measured, accompanied with malfunctions of (1) failure to start, (2) failure to continue to operate, and (3) inaccuracy.

Concerning improvement over previous Patent No. 3,113,415 the device of the present invention is virtually unaffected by rotation and centrifugal forces, for example, as may be caused by the spin of an ordnance projectile. Thus a primary object of this invention is to provide a velocity regulating device which is virtually unaffected by centrifugal forces and wherein infinitely small increments of time are available for use, wherein continuity of operation is assured, and wherein accuracy is assured. Again, the present invention deals with a vibrating mass that oscillates at a substantially high frequency as compared with ordinary "ticking" devices, and runs continuously instead of stopping for each oscillatory period. As a result the divisions or increments of time are correspondingly small. Furthermore, starting and continuity of operation, and accuracy are all inherent in the oscillating mass involved, and which governs the speed of the drive therefor with extreme accuracy. Briefly, the instant device cannot miss a beat, nor can it jam, and on the contrary its operation is continuous and absolutely uniform.

It is an object of this invention to provide a velocity regulating device that requires but a minimum of driving force for its operation.

It is an object of this invention to provide a timepiece or velocity regulating device that avoids the use of delicate and vulnerable parts and elements. Intricacy is virtually eliminated in this sense.

It is an object of this invention to provide a velocity regulating device usefully employing in combination, (1) frictional inherencies, (2) rotational oscillation of a mass, and (3) non-linear motion. These principles are employed in a physical embodiment that is simple and rugged and which is easily manufactured and maintained.

It is an object of this invention to provide an accurate mechanical timing device wherein the timing capability is infinitely variable. By employing the angular velocity controlling means hereinafter disclosed, a power input source can be made to drive at a constant velocity and this resultant constant velocity can be readily employed as circumstances require. Hence, by utilizing appropriate means, time can be made infinitely divisible.

It is another object of this invention to provide a highly accurate speed sensitive and governing device which exclusively employs rotative motion throughout its entire timing operation and which operates continuously without stopping.

The various objects and features of this invention will be fully understood from the following detailed description of the typical preferred form and application thereof, throughout which description reference is made to the accompanying drawings, in which:

FIG. 7 illustrates the phase and amplitude relationship between the output shaft and the oscillating mass at angular velocity K.

FIG. 8 is similar to FIG. 7 but illustrates the intermediate angular velocity L shown in FIG. 6.

FIG. 9 is similar to FIGS. 7 and 8, and illustrates the higher angular velocity M shown in FIG. 6.

FIGS. 10 and 11 are graphs similar to the preceding figures and illustrating the plus and minus value of amplitude of angular vibration as it is related to time.

FIG. 12 is a graphic illustration of the torsional load applied on the transmission as related to amplitude of torsional vibration.

FIG. 13 is a graph, similar to FIG. 12, illustrating the power loss in the transmission as related to torsional load.

FIG. 14 is a graph particularly characteristic of the present invention illustrating the power loss as it is related to angular velocity, the substantially vertical portion of the curve establishing a velocity controlling barrier.

FIGS. 15, 16 and 17 stand by themselves to illustrate a further improvement of the present invention wherein the characteristic curve of FIG. 14 is steepened so as to provide a precise velocity control barrier.

FIG. 18 illustrates the timing characteristics found as a result of operating a working model of this invention.

When a driving mechanism having a non-linear transmission is coupled to a system capable of torsional vibration, the vibratory excursions of the driven mass will be most materially affected at its fundamental frequency, by the addition or by the subtraction of power applied without affecting a significant change in the fundamental torsional vibration frequency. Further, if the motive power for rotating a mass capable of efficient torsional vibration has output velocity variations (pulsating or instantaneous, or otherwise) occurring at the fundamental frequency of the device, as determined by the rotational inertias and by the spring constants involved, there will be a narrow speed range wherein an efficient energy transfer will occur between the power source and the torsionally vibrating mass. This energy transfer will be periodic at the fundamental frequency and will occur as the vibratory excursions of the mass are brought about by the cyclic interchange of potential and kinetic energy.

Figure 1:
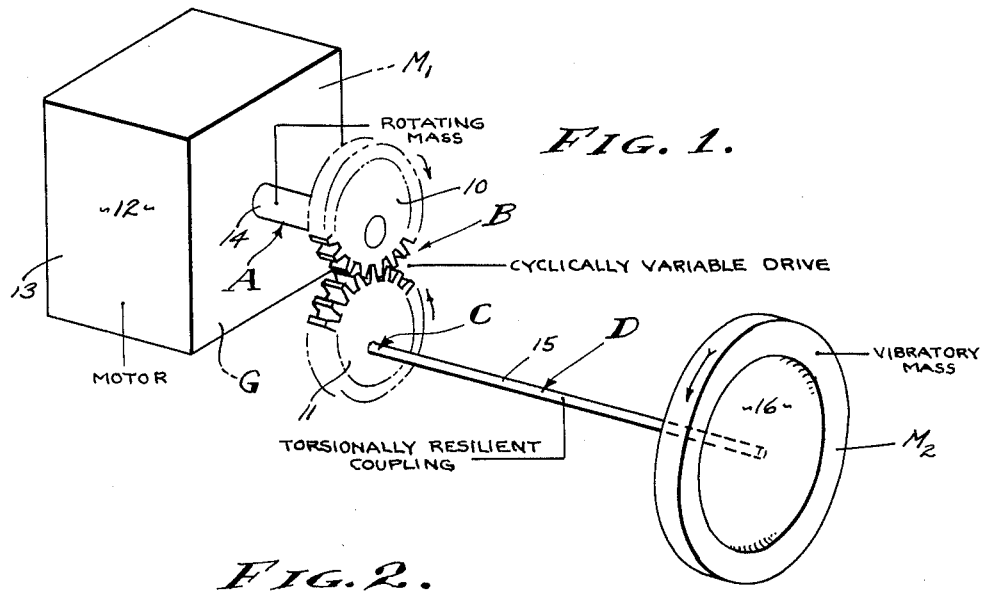
FIG. 1 is a perspective view illustrating a physical embodiment of the present invention.

Fundamentally, this invention is embodied in a drive source which has a cyclic ripple or angular velocity variation that is resiliently coupled to a torsionally vibrating mass. FIG. 1 illustrates the physical embodiment which involves generally, a constant speed shaft A, a non-linear drive means B variably rotating a shaft C from shaft A, a mass $M_1$ revolving with shaft A, a mass $M_2$ revolving with shaft C, and an elastic torsional coupling D between the mass $M_2$ and shaft C.

The shafts A and C are free to revolve as upon antifriction bearings (not shown), it being understood that any friction in the moving parts requires an amount of power applied to equal it and results in a damping effect upon motion involved. As shown, the two shafts are parallel and offset one from the other, or they can be angularly related if so desired.

Figure 2:
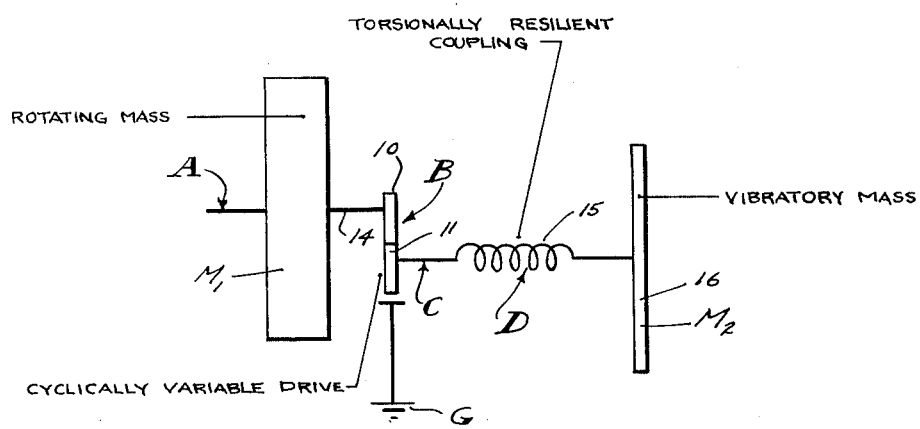
FIG. 2 is a diagrammatic representation illustrating the interconnected and vibratory spring connected masses of the present invention.

In FIGS. 1 and 2 of the drawings it will be seen that here is a periodically varying angular velocity transmission comprising the means B and about which the masses $M_1$ and $M_2$ are diagrammed. One of these masses ($M_2$) is the vibratory mass while its counterpart is the mass $M_1$ composed of the moving parts that exist in the revolving mechanism which precedes the torsional coupling D. Thus, there are two masses $M_1$ and $M_2$ with the resilient torsional coupling D therebetween. The said two masses are journalled to revolve and the mass $M_1$ is preferably of substantially greater value or moment of inertia than the mass $M_2$, their comparative physical configurations varying greatly as shown. Characteristically, however, these two masses are revoluble; the mass $M_2$ being a rotatably vibratory mass and the mass $M_1$ being a continuously driven and velocity controlled mass.

Figure 3:
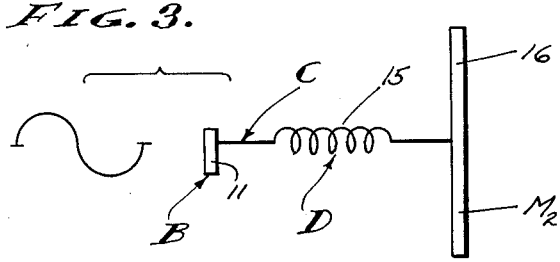
FIG. 3 is a classic representation of the rotatably vibratory mass involved as it is related to a resilient coupling.

In FIGS. 1 and 2 we have illustrated the character of the non-linear drive means B which, in the case illustrated, sinusoidally relates the two masses $M_1$ and $M_2$. This drive can vary widely so long as it imparts a variation into the velocity relationship between the masses $M_1$ and $M_2$ and which is required of the present invention in order to excite the torsional vibration involved. For example, the means B can be a non-uniform velocity universal joint operating through an angle, or a pulse generating or discontinuous prime mover, or a non-conjugate gearing, or a long link chain drive, or a crank and connecting rod arrangement; any one of which could be adapted to the present purpose. For simplicity we have illustrated a pair of eccentrically matched gears 10 and 11 which intermesh so as to be driven at a controlled continuous velocity at shaft A, and so as to drive the output gear 11 at sinusoidal velocity rates as is depicted in FIG. 3. The shaft A can be driven by any suitable motor adapted to apply torque, as for example a spring motor having a case 13 which is anchored to ground and a drive shaft 14 which is integral with the shaft A. Schematically the ground is illustrated at G in FIGS. 1 and 2. For the purpose of discussion herein it is assumed that the journals of shafts A and C are fixed to ground, represented in FIGS. 1, 2 and 16 as G. As a result, the input torque from the motor 12 through mass $M_1$ revolves shaft A and the input to the non-linear drive means B. The output of drive means B revolves with a cyclic rotational velocity variation thus exciting mass $M_2$ into a vibratory oscillation with respect to mass $M_1$.

FIGS. 1, 2 and 3 best illustrate the resilient or more accurately defined elastic torsional coupling D which elastically joins masses $M_1$ and $M_2$. Any common form of spring can be used for this purpose and we have shown a torsion bar spring 15 which is anchored at one end to the gear 11 and at the other end to the mass $M_2$ in the form of a flywheel 16. By providing the elastic torsional coupling D between the two masses $M_1$ and $M_2$ the mass $M_2$ can vibrate (oscillate) with respect to mass $M_1$, the amplitude of $M_2$ being a function of the spring constant of the elastic coupling D, the amplitude variation of the non-linear drive means B, the relative inertias of the masses $M_1$ and $M_2$, the speed of shaft A, and the values of viscous damping and/or friction of the components involved such as gears and bearings.

The foregoing described components cooperate with each other in the following manner to regulate rotational velocity (speed of shaft A) utilizing wave energy, as follows: The mass $M_2$ and torsional elastic coupling D cooperate together as a torsionally vibratory system having a characteristic fundamental frequency classically called the "natural resonant frequency." This natural resonant frequency is independent of the mass $M_1$ when its inertia is very large (approaching infinity) and this condition is assumed for clarity of explanation. For said clarity, the preferably greater inertial mass $M_1$ is considered very large in relation to mass $M_2$ and is assumed to have a non-varying angular velocity, although it is to be understood that in reality mass $M_1$ does have a varying angular velocity dependent upon its inertia in relation to the inertia of mass $M_2$. In this case where the inertia of mass $M_1$ is much greater than the inertia of mass $M_2$, this varying angular velocity of said mass $M_1$ is small. Thus, the preferably greater mass $M_1$ revolved by the torque of motor 12 increases the speed of the shaft A which revolves the shaft C with a cyclically varying velocity by the functioning of the non-linear drive means B. The cyclic variation of speed of shaft C is directly proportional to the speed of shaft A. Therefore, shaft C revolves and excites the vibratory system (mass $M_2$ and torsional spring D) accelerating its average speed from zero toward the speed at which the frequency of the cyclic rotational speed variation of shaft C is equal to the fundamental vibration frequency of mass $M_2$.

As the excitation of the vibratory system increases from zero (shaft A increasing in speed) the amplitude of velocity variation of the vibratory system increases slowly at first and then greatly as the cyclic velocity variation approaches the fundamental vibrating frequency of the vibratory system. For an ideal vibratory system having minimal friction and viscous damping, the characteristic curve, of amplitude versus cyclic speed variation (frequency) for a vibrating spring mass system, is nearly vertical near the fundamental frequency. Therefore, very small changes in frequency relating to near insignificant change in rotational speed of shaft A will cause a significant change in vibration velocity amplitude. It will be apparent that the torque at shaft C (and through the drive means B opposed by the inertia of mass $M_1$) is proportional to the amplitude of vibration of mass $M_2$.

Preferably within the drive means B, the energy loss which varies with the torque at shaft C (and the amplitude of vibration of mass $M_1$) is employed as a velocity control barrier. For instance, there is no power loss in means B when there is no torsional load applied; but as the torsional load increases the energy loss increases. Furthermore there is an energy loss both when mass $M_2$ is accelerating and when it is decelerating, to the end that varying efficiency rates will occur in the means B (at gears 10 and 11) dependent upon the amplitude of the mass $M_2$ excursions (amplitude of angular vibration of mass $M_2$ relative to mass $M_1$). As a result, there is a frictional buildup proportional to torsional load imposed upon the drive means B whereby a rotational speed or velocity "barrier" is established through which the vibrating function will not penetrate, since any excess energy (torque) to accelerate the shaft A above the fundamental vibrating frequency of mass $M_1$ is dissipated as frictional loss in the drive means B.

In accordance with the method and in order for an understanding of the operation and function of the particular embodiment hereinabove described, the following description is related to the drawings: In FIG. 2 the shafts A and C are offset by the matched gears 10 and 11 comprising the non-linear drive means B, while the mass $M_1$ is shown of substantially greater value than mass $M_2$. It is significant that a ground or anchor is indicated at G. In FIG. 3 I have shown the classic symbols for rotational mass $M_2$ coupled to means B by a torsionally resilient spring; and the sinusoidal wave represents the angular velocity variations imposed at means B.

Figure 4:
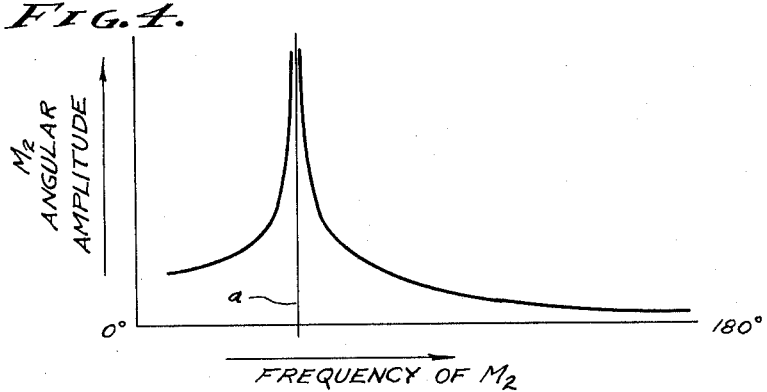
FIG. 4 is a graphic illustration of the angular amplitude (vibration) of the mass shown in FIG. 3 as it is related to frequency.
Figure 5:
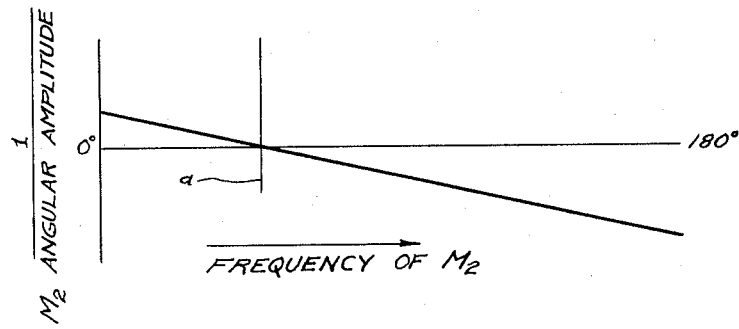
FIG. 5 is a graph similar to FIG. 4 but wherein the relationship of angular amplitude to frequency is shown, reciprocally, as a straight line.

FIGS. 4 and 5 depict the angular amplitude of the mass $M_2$ as related to the velocity variation frequency of drive means B. Essentially, however, and for the purpose of discussion, it is assumed that the angular velocity of $M_1$ is constant while the lighter mass $M_2$ oscillates rotatably. Therefore, the horizontally disposed line of FIGS. 4 and 5 depict the frequency of the cyclic rotational velocity variation of the mass $M_2$. As the speed of drive means B is increased the cyclic variation of rotational velocity (input frequency to the vibratory system) is increased and the velocity variation amplitude of vibration of mass $M_2$ increases, it being a phenomenon that said increase in amplitude becomes increasingly greater as the fundamental frequency of the mass $M_2$ and torsional spring D is approached. As a result of this the curve more or less parallels the frequency line and then turns sharply so as to more or less parallel the fundamental frequency line $a$. The amplitude versus frequency curve will eventually cross the line $a$ at a very large angular velocity variation amplitude for vibratory systems having minimal friction losses and then the curve continues toward very large frequencies as indicated. The significant feature of FIG. 4 is the "steepness" of the said curve where it substantially parallels the line $a$, the fundamental frequency. Thus, it will be seen that the mass $M_2$ angular vibratory amplitude increases tremendously and increasingly only as the frequency closely approaches the fundamental frequency, but not until this fundamental frequency is approached.

Because of the relationship of phase angle to amplitude there is an in phase component of torque which increases the cyclic rotational velocity variation. As the fundamental frequency is approached by a corresponding increase in shaft A speed, a proportionately larger transfer of energy occurs and the vibratory excursions of $M_2$ are greatly increased.

Figure 6:
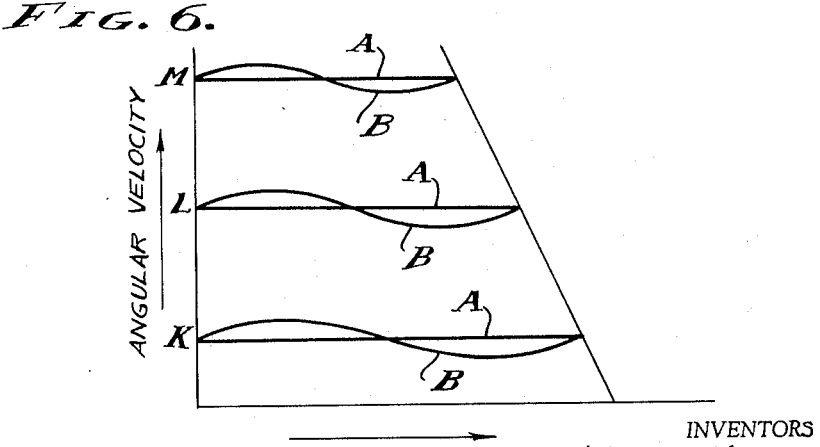
FIG. 6 illustrates three arbitrarily chosen angular velocities K, L and M occurring at frequencies less than the fundamental frequency shown in FIGS. 4 and 5.

Referring now to FIG. 6 we have arbitrarily shown three velocities of shafts A and drive means B, designated as K, L and M. The velocities chosen are each within the operating range of the method and apparatus, the angular velocity of shaft A being constant (presumably) in each case and the angular velocity output of drive means B being sinusoidally variable. As a result, the time period of cyclic velocity variation (inverse function of frequency of B) is shortened as the angular velocity (speed) of A is increased. However, the amount of change in angular velocity imposed at drive means B remains the same as depicted.

In FIG. 7 velocity is repeated with the motion of mass $M_2$ added. Their figure illustrates the condition wherein the angular velocity of shaft A is (presumably) constant; wherein the angular velocity of B (gear 11) is sinusoidally variable; and wherein the angular velocity of mass $M_2$ is vibrationally lagging the velocity of B, in time. This is a low angular velocity condition.

In FIG. 8 velocity L is repeated with the motion of mass $M_2$ added. This figure illustrates an accelerating condition much the same as described immediately above. However, it will be observed that angular velocity of mass $M_2$ is increased.

In FIG. 9 velocity M is repeated with the motion of mass $M_2$ added. This figure illustrates an accelerated condition to be distinguished from conditions of K and L and wherein the phase lag is up to but not exceeding 90°. In this condition the mass $M_2$ excursion or angular velocity reaches an operational maximum.

In FIGS. 10 and 11 is shown the conditions of K and M, respectively, as related to plus and minus values with respect to rotational displacement amplitude of vibration, it being realized that in reality these two curves are displaced 90° in phase from FIGS. 7 and 9. These two graphs show that velocity and amplitude are related and that the accelerating nature of the mass excursions produces plus and minus values, having increasingly extreme proportions only when condition M occurs, as and when the fundamental frequency is closely approached as in FIG. 9. In FIG. 12 the torsional load on means B is depicted as it relates to the amplitude represented by mass $M_2$ in FIGS. 10 and 11, for example, and the said load (transmission torque load) is also a plus and minus as it tends to resist or assist the drive action. Either a plus or minus torque load is reflected in a transmission as a transmissive loss which is largely dependent on the systems efficiency. Since the power loss in a transmission is a direct function of load; FIG. 12 is redrawn in FIG. 13 to show that the power loss is always a positive factor and that this is the case whether the torsional load is plus or minus, the slope of the curves, of course, being dependent on the transmissive efficiency.

Finally, FIG. 14 illustrates how the transmission power loss shown in FIG. 13 is related to the angular amplitude first plotted in FIG. 4. Again, the arbitrary velocities K, L and M are indicated, and the characteristics of angular amplitude increase of mass $M_2$ at or near the 90° phase position is shown to impose torsional force increase upon the non-linear drive means B. As a result, the power loss likewise increases as clearly shown by the steepened substantially vertical portion of the curve of FIG. 14. It is this extreme and ever increasing power loss which then produces the barrier which controls the angular velocity at or near the 90° phase position and necessarily in timed relation with the natural vibrating frequency of mass $M_2$.

From the foregoing it will be seen that a wide range of torsional load can be applied without materially changing the angular velocity of shaft A, along the substantially vertical portion of the angular amplitude curve of FIG. 4 (also shown in FIG. 14). However, it will be observed that said portion of the curve is not necessarily vertical. Therefore, a further improvement of the method and apparatus is to advantageously employ the mass differential between masses $M_1$ and $M_2$. In FIGS. 15 and 16 rectilinear moving masses $M_1$ and $M_2$ are shown for illustrative purpose, the vibration nodal points intermediate the masses being shown in each case. In FIG. 15 the masses $M_1$ and $M_2$ are free, whereas in FIG. 16 the mass $M_1$ is frictionally engaged with ground G (the same as by means of the power loss hereinabove referred to). These two FIGS. 15 and 16 are projected one from the other, orthographically, whereby it can be observed that there is a shifting of the nodal point. This shifting of the node is dependent upon power loss and alters the vibration characteristics of the resilient coupling D and mass $M_1$ and consequently alters the fundamental frequency of the vibratory mass $M_2$. In FIG. 17 we have shown such a change in fundamental frequency of mass $M_2$ which is due to power loss absorbed at ground G or the like. As indicated, as the power loss is increased there is a change in fundamental frequency of mass $M_2$. Therefore, the effective portion of the curve is moved to effect a more nearly vertical position of the power loss transmission curve shown in FIG. 14 and depicted in FIG. 17 by the dotted line curve fragments. This effect is a function of the relationship of the masses involved and the efficiency of coupling and as indicated the dotted line curve fragments for two vibrational amplitudes for a given set of parameters.

The method and device disclosed is particularly suitable for a spin stabilized environment. Since the masses involved are circular and because there are no radially moving or vibrating masses to be acted upon by centrifugal force, spin has no effect. Some of the parameters of velocity regulation have been studied and correlated, as graphically depicted in FIG. 18. Line 20 shows the r.p.m. versus time results using a relatively lightweight aluminum mass $M_2$. Line 21 shows the r.p.m. versus time results of the same configuration of parts using a heavier steel mass $M_2$, and whereby the controlled speed is slower agreeing with the fundamental principles of the relationship between the natural resilient frequency of a mass restrained by a spring. Line 22 shows the r.p.m. curve of the spring motor 12 using a rigid coupling between the two masses $M_1$ and $M_2$, one mass on the input shaft A and one mass coupled to the output shaft C by a torsionally rigid coupling D. This line 22 demonstrates the "free" speed without the regulatory effect of the invention as disclosed.

Having described only a typical preferred form and application of our invention, we do not wish to be limited or restricted to the specific details herein set forth, but wish to reserve to ourselves any modifications or variations that may appear to those skilled in the art and fall within the scope of the following claims.

Having described our invention, we claim:

1. A method of regulating angular velocity of a device comprising creating an angular velocity sensitive cyclical phase relationship between two rotatable masses by use of a transmission coupling and using the natural resonant frequency between the coupled masses to increase power losses of the transmission coupling to regulate the angular velocity.

2. A method of regulating angular velocity comprising rotatably driving a first mass with a torque means, coupling the first mass through a nonlinear transmission and resilient coupling to a second mass whereby inefficiency of the coupling absorbs variations in driving torque when periodicity of the nonlinear transmission closely approximates the fundamental frequency of the resilient coupling to regulate the angular velocity of the torque means.

3. A method of regulating angular velocity comprising rotating a first mass which is to be velocity regulated from a torque producing rotating drive means, rotating a second mass from the first mass with a periodically varying torque having a frequency which is proportional to the angular velocity of the rotating drive means, and elastically coupling the two masses to permit rotational oscillation relative to each other whereby angular speed of the second mass changes synchronously with the periodically varying torque to regulate the angular velocity of the rotating drive means.

4. The method of claim 1 in which one of the rotatable masses is a torque producing means having a pulsating output of predetermined frequency and the transmission coupling resiliently couples the torque producing means to the remaining rotatable means, further including the step of selecting the remaining rotatable mass and the resilient transmission coupling to establish a natural resonant frequency substantially equal to the frequency of the pulsating output of the torque producing means.

5. The method of claim 1 in which one of the rotatable masses is a torque producing drive means having a pulsating output and the transmission coupling resiliently couples the torque producing drive means and the remaining rotatable mass, further including the step of selecting the remaining rotatable mass and resilient transmission coupling so as to have angular velocity oscillations between the two rotatable masses at a resonant frequency substantially equal to the frequency of the pulsating output of the torque producing drive means.

6. A method of regulating angular velocity comprising rotating a first mass from a rotating drive means which is to be velocity regulated, rotating a second mass from the first mass with a periodically varying angular speed having a frequency which varies in proportion to the angular velocity of the rotating drive means, elastically coupling the two masses for rotational oscillation relative to each other, and selectively relating weight differential between the two masses to control the frequency of the periodically varying angular speed of the second mass and regulate the angular velocity of the rotating drive means.

7. In a rotational velocity regulating device a first rotatable mass, a second rotatable mass, and coupling means between the masses including a torsionally elastic spring means that affects an angular speed phase relationship between the two masses having a cyclic rate dependent upon angular velocity of the masses and increases transmission losses between the masses as the cyclic rate approaches the fundamental frequency of oscillation of the coupled masses.

8. An angular velocity regulated device comprising means for producing a driving torque coupled to a first rotatable mass, a second rotatable mass, transmission means coupling the masses including a torsional spring, with oscillatory angular vibration between the masses affecting transmission coupling efficiency so as to absorb driving torque and regulate angular velocity of the device when the oscillatory angular vibration approaches natural fundamental oscillation frequency existing between the coupled masses.

9. An angular velocity regulated device comprising torque drive means for rotating a first mass which is coupled to a second mass by a coupling means including a transmission means having a cyclically variable angular speed output of a frequency determined by angular velocity of the torque drive means and including an elastic coupling for providing a fundamental frequency of oscillation between the masses whereby power transmission losses absorb driving torque when the angular velocity of the torque drive means causes the frequency of the cyclically variable angular speed output of the transmission means to become approximately equal to the fundamental frequency of oscillation of the coupled masses.

10. An angular velocity regulated device comprising a first rotatable mass, drive means for the first rotatable mass, the drive means having a cyclically varying angular speed, a second rotatable mass, torsionally elastic means coupling the first and second rotatable masses whereby angular speed of the second rotatable mass vibrates synchronously with the cyclically varying angular speed of the drive means to regulate the angular speed of the first rotatable mass.

11. The device of claim 10 in which the drive means is a torque producing means delivering cyclically varying torque output through the first rotatable mass and the torsionally elastic means establishes a natural resonant frequency of angular speed vibrations for the second rotatable mass which is substantially equal to the frequency of the cyclically varying output of the torque producing means.

12. The device of claim 10 in which the drive means is a torque producing means delivering cyclically varying torque output through the first rotatable mass and synchronous angular speed vibrations of the second rotatable mass have a frequency substantially equal to that of the cyclically varying torque output of the torque producing means.

No references cited.

LEYLAND M. MARTIN, *Primary Examiner.*

UNITED STATES PATENT OFFICE
CERTIFICATE OF CORRECTION

Patent No. 3,217,485                           November 16, 1965

C Walton Musser et al.

It is hereby certified that error appears in the above numbered patent requiring correction and that the said Letters Patent should read as corrected below.

Column 1, lines 26 and 27, beginning with "The regulatory" strike out all to and including "power supply." in lines 48 and 49, same column 1, and insert the same after "output." in line 2, column 2.

Signed and sealed this 13th day of December 1966.

(SEAL)
Attest:

ERNEST W. SWIDER                          EDWARD J. BRENNER
Attesting Officer                              Commissioner of Patents